United States Patent
Yamamoto et al.

(10) Patent No.: US 11,923,691 B2
(45) Date of Patent: Mar. 5, 2024

(54) VEHICLE ROOF

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yasuyuki Yamamoto, Mie (JP); Housei Mizuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 670 days.

(21) Appl. No.: 17/054,659

(22) PCT Filed: May 10, 2019

(86) PCT No.: PCT/JP2019/018681
§ 371 (c)(1),
(2) Date: Nov. 11, 2020

(87) PCT Pub. No.: WO2019/225351
PCT Pub. Date: Nov. 28, 2019

(65) Prior Publication Data
US 2021/0083519 A1     Mar. 18, 2021

(30) Foreign Application Priority Data
May 24, 2018   (JP) .................................. 2018-099250

(51) Int. Cl.
*H02J 50/12*     (2016.01)
*H02J 50/00*     (2016.01)

(52) U.S. Cl.
CPC ............ *H02J 50/12* (2016.02); *H02J 50/005* (2020.01); *H02J 2310/40* (2020.01)

(58) Field of Classification Search
CPC ...... H02J 50/12; H02J 50/005; H02J 2310/40; H02J 50/402; H02J 2310/46; H02J 5/005;
(Continued)

(56) References Cited

U.S. PATENT DOCUMENTS

2010/0277121 A1\* 11/2010 Hall ........................ H02J 50/90
                                                              320/108
2011/0316334 A1   12/2011 Shimokawa
(Continued)

FOREIGN PATENT DOCUMENTS

JP      S56-115045 A    9/1981
JP      2008-001250 A   1/2008
(Continued)

OTHER PUBLICATIONS

International Search Report dated Jul. 16, 2019 for WO 2019/225351 A1 (4 pages).

*Primary Examiner* — Stacy Whitmore
(74) *Attorney, Agent, or Firm* — Venjuris, P.C.

(57) ABSTRACT

An object of the invention is to make it possible to retain a wire for contactless energy transmission in a certain path with a simple configuration without using insert molding. A component for contactless energy transmission includes a base member including a flat portion, and a wire for contactless energy transmission, the wire being fixed onto a main surface of the flat portion while being arranged along a certain path.

5 Claims, 9 Drawing Sheets

(58) Field of Classification Search
CPC ........... H02J 7/025; H02J 50/00; B60R 16/02; H01F 38/14
See application file for complete search history.

(56) References Cited

U.S. PATENT DOCUMENTS

| | | | | |
|---|---|---|---|---|
| 2012/0223573 | A1* | 9/2012 | Schatz | H02J 50/12 307/104 |
| 2013/0221744 | A1* | 8/2013 | Hall | H02J 50/50 307/9.1 |
| 2013/0249482 | A1* | 9/2013 | Iwanaga | H05K 9/0007 320/108 |
| 2013/0278053 | A1* | 10/2013 | Bauer | B64D 11/0624 307/104 |
| 2014/0252813 | A1* | 9/2014 | Lee | H02J 50/402 297/180.12 |
| 2015/0255994 | A1* | 9/2015 | Kesler | B60L 53/124 307/10.1 |
| 2016/0301236 | A1* | 10/2016 | Krishnamurthi | H02J 50/12 |
| 2016/0365745 | A1* | 12/2016 | Hyun | H02J 50/10 |
| 2018/0262050 | A1 | 9/2018 | Yankowitz | |
| 2018/0294677 | A1* | 10/2018 | Yankowitz | H02J 50/12 |
| 2022/0278560 | A1* | 9/2022 | Sakurai | H02J 50/005 |
| 2023/0133571 | A1* | 5/2023 | Lee | G08B 5/36 340/815.45 |
| 2023/0197494 | A1* | 6/2023 | Lee | H01L 21/67709 414/217 |

FOREIGN PATENT DOCUMENTS

| | | |
|---|---|---|
| JP | 2011-243772 A | 12/2011 |
| JP | 2011-244606 A | 12/2011 |
| JP | 2012-044827 A | 3/2012 |
| JP | 2012-103793 A | 5/2012 |
| JP | 2015-101244 A | 6/2015 |
| JP | 2015-133827 A | 7/2015 |
| JP | 2016-048979 A | 4/2016 |
| JP | 2017-063536 A | 3/2017 |
| WO | WO-2014152004 A1 * | 9/2014 ............. B60L 53/12 |

* cited by examiner

VEHICLE ROOF

CROSS REFERENCE TO RELATED APPLICATIONS

This application is a national phase of PCT application No. PCT/JP2019/018681, filed on 10 May 2019, which claims priority from Japanese patent application No. 2018-099250, filed on 24 May 2018, all of which are incorporated herein by reference.

TECHNICAL FIELD

The present disclosure relates to a component for contactless energy transmission, a seat, a vehicle roof, and a vehicle door.

BACKGROUND

Patent Document 1 discloses a configuration in which a power receiving coil is integrally molded with an interior finishing member of a door through insert molding, as well as a configuration in which a power receiving coil in the form of a sheet in which a wound coil material is sandwiched between resin films is formed, and the sheet is attached to an inner surface of an interior finishing member of a door.

PRIOR ART DOCUMENT

Patent Document

Patent Document 1: JP 2015-133827A

SUMMARY OF THE INVENTION

Problems to be Solved

However, the former configuration needs a mold device for insert molding the power receiving coil into the interior finishing member. On the other hand, the latter configuration employs a structure in which the wound coil material is kept in the wound form by being sandwiched between the resin films, and the structure is thus complex.

To address these issues, an object of the present disclosure is to make it possible to retain a wire for contactless energy transmission in a certain path with a simple configuration without using insert molding.

Means to Solve the Problem

A component for contactless energy transmission of the present disclosure includes a base member including a flat portion, and a wire for contactless energy transmission, the wire being fixed onto a main surface of the flat portion while being arranged along a certain path.

Effect of the Invention

According to the present disclosure, it is possible to retain the wire for contactless energy transmission in the certain path with a simple configuration without using insert molding.

DETAILED DESCRIPTION TO EXECUTE THE INVENTION

Description of Embodiments of the Present Disclosure

First, embodiments of the present disclosure will be listed and described.

A component for contactless energy transmission of the present disclosure is as described below.

(1) The component for contactless energy transmission of the present disclosure is a component for contactless energy transmission that includes a base member including a flat portion, and a wire for contactless energy transmission, the wire being fixed onto a main surface of the flat portion while being arranged along a certain path. By fixing the wire for contactless energy transmission onto the main surface of the flat portion of the base member while arranging the wire along a certain path, it is possible to retain the wire for contactless energy transmission in the certain path with a simple configuration without using insert molding.

(2) The base member may be a bendable member. By fixing the wire for contactless energy transmission onto the main surface of the bendable base member, it is possible to retain the wire along a certain path. Thus, for example, when this base member is disposed so as to conform to a surface of an assembly target member, the wire for contactless energy transmission can be easily incorporated into the assembly target member. Alternatively, for example, the component for contactless energy transmission can be directly fixed to a bendable member serving as a component of a vehicle.

(3) The base member may be a vehicle body component that is hard enough to retain a certain shape. In this case, it is possible to directly retain the wire for contactless energy transmission on the vehicle body component while being arranged along a certain path.

(4) A seat of the present disclosure is a seat in which the above-described component for contactless energy transmission is incorporated. In this case, the seat is suited to, for example, supplying power in a contactless manner to, or sending and receiving radio signals to and from, a terminal device or the like carried by a passenger seated on the seat.

(5) The seat may include a seat portion and a backrest portion, wherein the component for contactless energy transmission is incorporated in one of the seat portion and the backrest portion, and an energy relay coil is incorporated in the other of the seat portion and the backrest portion. Since the component for contactless energy transmission is incorporated in one of the seat portion and the backrest portion, and the energy relay coil is incorporated in the other, the energy transmission range can be effectively expanded.

(6) A vehicle roof of the present disclosure is a vehicle roof in which the component for contactless energy transmission is incorporated. Since the component for contactless energy transmission is incorporated in the vehicle roof, the vehicle roof is suited to, for example, supplying power in a contactless manner to, or sending and receiving radio signals to and from, a terminal device or the like carried by a passenger under the vehicle roof, or sending and receiving radio signals to and from an external member.

(7) A vehicle door of the present disclosure is a vehicle door in which the component for contactless energy transmission is incorporated. Since the component for contactless energy transmission is incorporated in the vehicle door, the vehicle door is suited to, for example, supplying power in a contactless manner to, or sending and receiving radio signals to and from, a terminal device or the like carried by a passenger next to the vehicle door, or supplying power in a contactless manner to, or sending and receiving radio signals to and from, an electric component incorporated in the vehicle door.

Details of Embodiments of the Present Disclosure

Specific examples of the component for contactless energy transmission, the seat, the vehicle roof, and the vehicle door of the present disclosure will be described with reference to the drawings below. Note that the present invention is not limited to the following examples, but rather is defined by the claims, and all changes that come within the meaning and range of equivalency of the claims are intended to be embraced therein.

Embodiment 1

Figure 1:
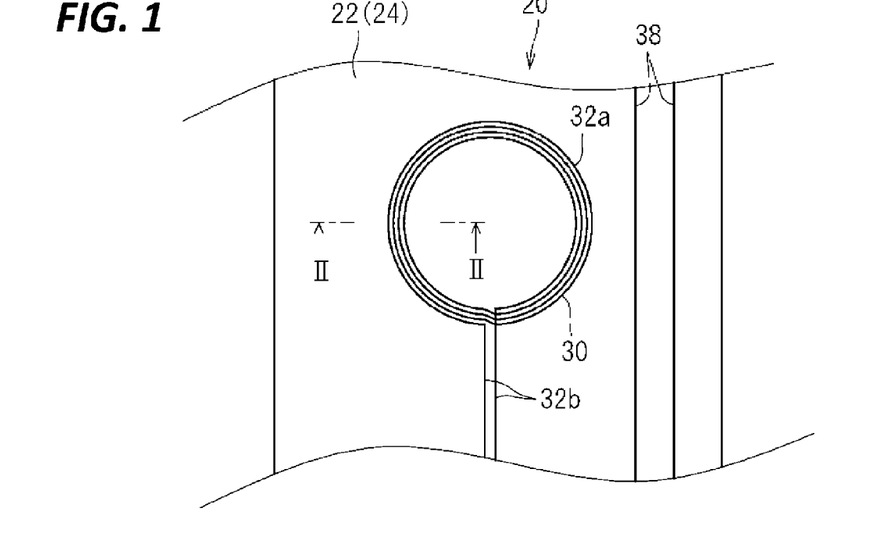
FIG. 1 is a schematic plan view showing a component for contactless energy transmission according to Embodiment 1.
Figure 2:
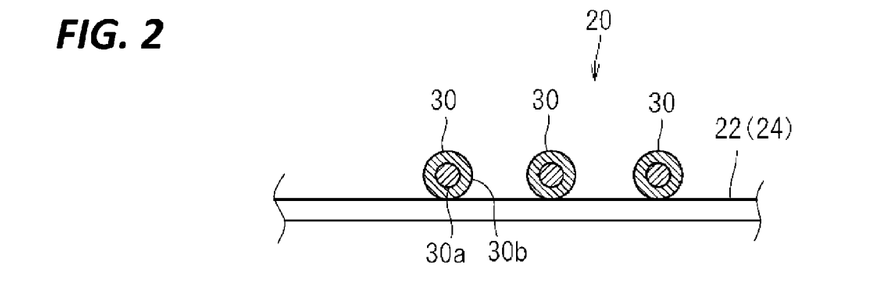
FIG. 2 is a schematic cross-sectional view taken along line II-II in FIG. 1.

Hereinafter, a component for contactless energy transmission according to Embodiment 1 will be described. FIG. 1 is a schematic plan view showing a component 20 for contactless energy transmission according to Embodiment 1, and FIG. 2 is a schematic cross-sectional view taken along line II-II in FIG. 1.

The component 20 for contactless energy transmission includes a base member 22 and a wire 30.

The base member 22 is a component including a flat portion 24.

The base member 22 may be a bendable member, or may be a vehicle body component that is hard enough to retain a certain shape.

As examples of the bendable base member 22, a sheet material that is flexible so as to be able to easily bend in a thickness direction, for example, a sheet material made of a material containing a resin such as PVC (polyvinyl chloride), PET (polyethylene terephthalate), or PP (polypropylene) is conceivable. This sheet material may be a sheet material that is uniformly filled with the material inside, or may be a nonwoven fabric sheet or the like. The sheet material can also contain a material such as a metal. It is preferable that the bendable base member 22 is flexible to such an extent that it can be disposed so as to conform to a surface of a member serving as an assembly target member.

The sheet material may have only a single layer, or may have a plurality of layers that are stacked together. In the case where the sheet material has a plurality of layers that are stacked together, for example, it is conceivable that a resin layer and a resin layer are stacked together. Moreover, for example, it is also conceivable that a resin layer and a metal layer are stacked together.

An example of the base member 22 serving as a vehicle body component that is hard enough to retain a certain shape is a resin panel component that constitutes a portion of the vehicle body, and, for example, cases are conceivable in which the resin panel component is a resin panel incorporated in a door, a door trim made of a resin and provided on the inner side of a door, a roof lining made of a resin, a resin panel provided in front of the driver's seat and the passenger seat, or other resin panels, resin bodies, or the like that constitute interior finishing members of the vehicle.

Here, a case in which the base member 22 is a bendable sheet material made of a resin, and the entirety thereof constitutes the flat portion 24 will be described by way of example.

The wire 30 is a part of the component for contactless energy transmission and is fixed onto a main surface of the flat portion 24 while being arranged along a certain path.

The wire 30 is a linear member including a conductive wire for transmitting electric energy toward an external member, or receiving electric energy from an external member and then transmitting the electric energy. Here, an example is described in which the wire 30 is an insulated wire 30 including a core 30a and an insulating coating 30b that covers the core 30a. The core 30a is constituted by one or more strands. A strand is made of a conductor such as copper, a copper alloy, aluminum, or an aluminum alloy. The insulating coating 30b a is formed by extrusion molding a resin material, such as PVC (polyvinyl chloride) or PE (polyethylene), around the core 30a. The wire 30 may also be a bare conducting wire, an enameled wire, a nichrome wire, or the like.

The insulated wire 30 is fixed onto the main surface of the base member 22 while being arranged along a certain path. Here, the insulated wire 30 includes a coil portion 32a and leading path portions 32b.

In the coil portion 32a, the insulated wire 30 is fixed to the base member 22 while being arranged along a certain path extending in a planar spiral shape. That is to say, the insulated wire 30 is fixed to the base member 22 while being arranged along a certain path that forms a kind of coil.

The insulated wire 30 is led out from the starting end (for example, an end that constitutes the outermost loop of loops) of the coil portion 32a. The insulated wire 30 is led out from the terminating end (for example, an end that forms the innermost loop of the loops) of the coil portion 32a. Portions of the insulated wire 30 that are fixed to the base member 22 along these two leading paths are the leading path portions 32b.

Note that, although the insulated wire 30 led out from the innermost loop of the coil portion 32a crosses the other loops, the loops are insulated from each other by the insulating coating 30b of the insulated wire 30.

There is no limitation on the configuration for fixing the insulated wire 30 on the main surface of the base member 22.

For example, as a configuration for joining the insulated wire 30 and the base member 22 to each other, a configuration in which the insulated wire 30 is welded to the base member 22 may be adopted. That is to say, at least one of the insulated wire 30 and the base member 22 has a resin material, and this resin material is melted and joined to the other of the insulated wire 30 and the base member 22. Here, both the insulating coating 30*b* and the base member 22 made of a resin are melted and joined to each other. In this case, it is preferable that the insulating coating 30*b* and the sheet material made of a resin contain the same resin material.

Figure 3:
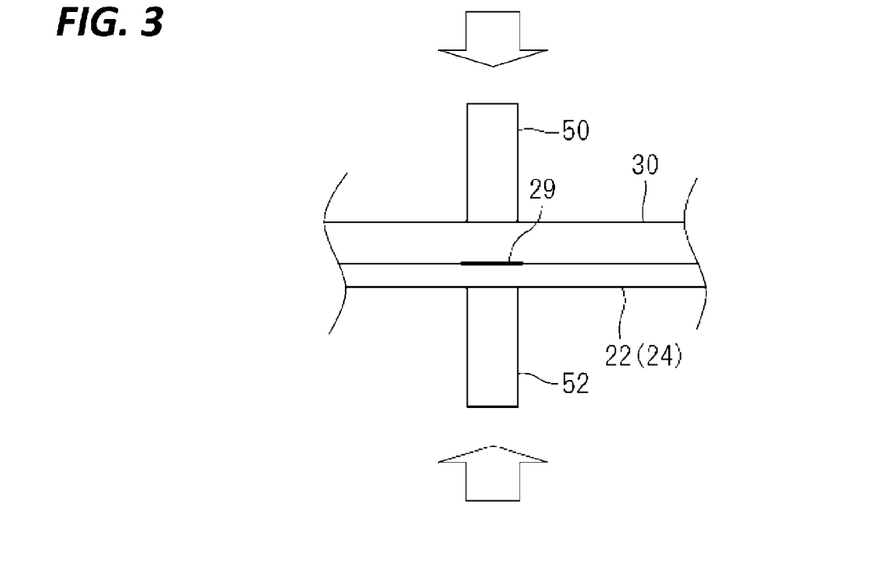
FIG. 3 is an explanatory diagram illustrating a step of ultrasonically bonding an insulated wire to a sheet material.

Specifically, for example, as shown in FIG. 3, the insulated wire 30 may be ultrasonically welded to the base member 22 by holding the insulated wire 30 and the base member 22 between a tip 50 and an anvil 52 for ultrasonic bonding. In this case, the insulated wire 30 and the base member 22 are joined to each other via a joining portion 29 formed by at least one of the insulated wire 30 and the base member 22 being melted.

The insulated wire 30 and the base member 22 can be welded to each other using various welding techniques including, in addition to the above-described ultrasonic welding, heat pressure welding, hot air welding, and high-frequency welding.

The insulated wire and the sheet material may also be joined to each other by the resin of at least one of the insulated wire and the sheet material being melted by applying heat, or using a solvent or the like. As such a joining configuration, for example, known joining configurations such as solvent welding, fusion bonding, and welding can be used.

The insulated wire 30 and the base member 22 may also be joined to each other using an adhesive, double-sided tape, or the like.

Figure 4:
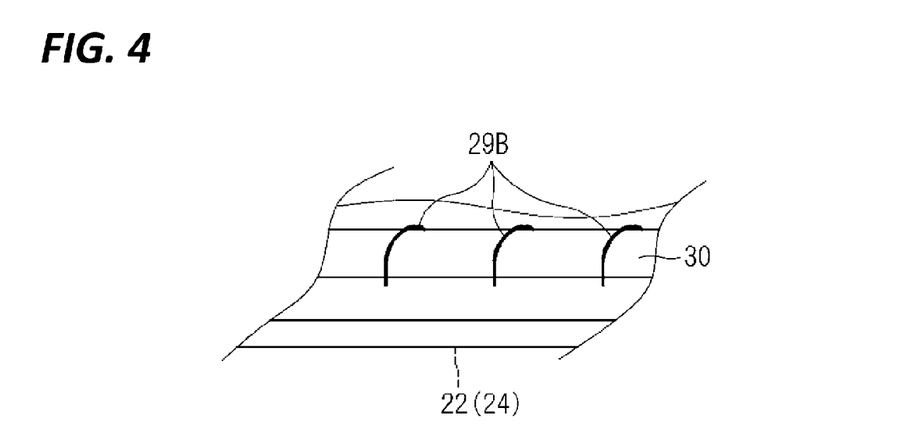
FIG. 4 is an explanatory diagram showing a state in which an insulated wire is sewn to a sheet material using a sewing thread.

Alternatively, as shown in FIG. 4, the insulated wire 30 may be joined to the base member 22 by being sewn to the base member 22 using a sewing thread 29B. In this case, a plurality of portions of the insulated wire 30 that are adjacent to each other may be sewn to the base member 22 using a common sewing thread.

In the example shown in FIG. 1, the insulated wire 30, in the coil portion 32*a*, is fixed to the base member 22 in such a manner as to extend in a circular spiral shape. The insulated wire 30 may be fixed to the base member 22 along a certain path extending in a polygonal, for example, triangular or rectangular, spiral shape. Moreover, the insulated wire 30 does not necessarily need to be fixed to the base member 22 along a spiral path. It is sufficient that the insulated wire 30 is fixed to the base member 22 along a path suited to releasing electric energy to an external member, or a path suited to receiving electric energy from an external member. For example, the insulated wire 30 may be fixed to the base member 22 in such a manner as to form a single loop, or may be fixed to the base member 22 in such a manner as to be fixed in a straight line shape and be able to function as a linear antenna.

Note that a linear transmitting member 38 that transmits electricity, light, or the like via wire transmission may also be fixed to the base member 22. The linear transmitting member 38 may be a bare conducting wire, a shielded wire, an enameled wire, a nichrome wire, an optical fiber, or the like. As the wire that transmits electricity, various signal lines and various power lines may be used. As the configuration for fixing the linear transmitting member to the base member 22, various configurations for fixing the insulated wire 30 to the base member 22 can be used as described above.

The insulated wire 30 that is fixed to the base member 22 in such a manner as to include the coil portion 32*a* as described above is used as a part for contactless energy transmission that releases energy to a surrounding space or receives energy from the surrounding space.

Assuming the case of contactless power supply, the insulated wire 30 serves as a part that transmits electric power energy in a contactless manner, and the coil portion 32*a* serves as a power supply coil, or a power receiving coil, for contactless power supply.

Assuming the case of contactless communication, that is, wireless communication, the insulated wire serves as a part that transmits electromagnetic wave energy in a contactless manner, and the coil portion 32*a* serves as an antenna that performs at least one of sending and receiving electromagnetic wave energy.

That is to say, the wire for contactless energy transmission can also be regarded as a member that realizes at least one of a member that causes a change in at least one of an ambient electric field and an ambient magnetic field and a member that is affected by a change in at least one of the ambient electric field and the ambient magnetic field.

Figure 5:
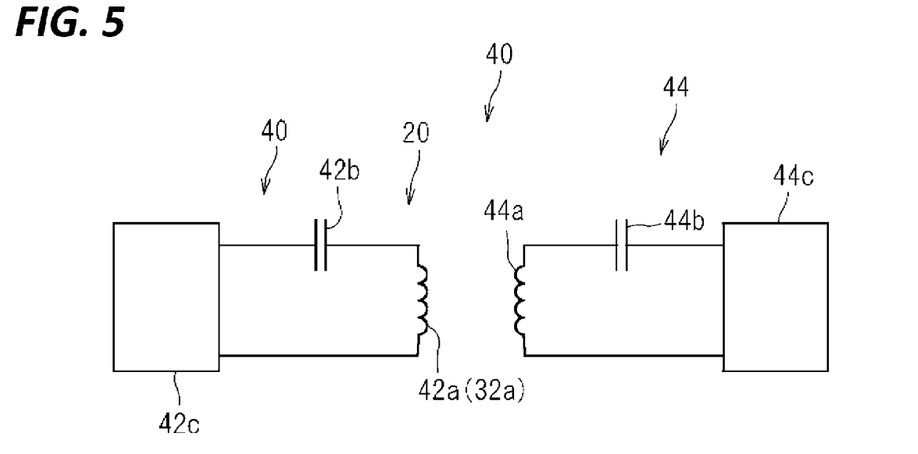
FIG. 5 is a block diagram showing a contactless power supply system based on magnetic resonance.

FIG. 5 is a block diagram showing a contactless power supply system 40 based on magnetic resonance by way of example.

A power supply device 42 includes a power supply coil 42*a*, a capacitor 42*b*, and an AC power source 42*c*.

The power supply coil 42*a* and the capacitor 42*b* are connected in series, and constitute a kind of resonant circuit. AC power is supplied from the AC power source 42*c* to the power supply coil 42*a* and the capacitor 42*b*.

A power receiving device 44 includes a power receiving coil 44*a*, a capacitor 44*b*, and a load 44*c*.

The power receiving coil 44*a* and the capacitor 44*b* are connected in series, and constitute a kind of resonant circuit. This resonant circuit is connected to the load 44*c*. The above-described resonant circuit of the power supply device 42 and the resonant circuit of the power receiving device 44 are adjusted to magnetically resonate.

In this contactless power supply system 40, when AC power from the AC power source 42*c* is supplied to the power supply coil 42*a*, the power supply coil 42*a* and the power receiving coil 44*a* magnetically resonate, and the power receiving coil 44*a* thus receives the AC power. The AC power received by the power receiving coil 44*a* is rectified to DC power, which is then supplied to the load 44*c*.

The coil portion 32*a* of the insulated wire 30 can be used as the power supply coil 42*a* or the power receiving coil 44*a* above. Also, the capacitor 42*b* or the capacitor 44*b* may be connected in the leading path portion 32*b* or the like of the insulated wire 30 that is arranged along the above-described base member 22.

As described above, the coil portion 32*a* of the insulated wire 30 can be used as a telecommunication antenna, such as a sending antenna, a receiving antenna, or a sending and receiving antenna. Furthermore, the coil portion 32*a* of the insulated wire 30 can also be used as an antenna that serves as both a telecommunication antenna and a power sending or receiving antenna.

With the component for contactless energy transmission that is configured as described above, when the insulated wire 30, which is the wire for contactless energy transmission, is fixed onto the main surface of the flat portion 24 of the base member 22 while being arranged along a certain path, the insulated wire 30 can be retained along the certain path, that is, a path suited to releasing or receiving energy, with a simple configuration without having to perform insert molding and without having to sandwich and fix the insulated wire 30 between a pair of films. Thus, a contactless energy transmission system can be easily incorporated.

Note that another sheet material or the like may be provided over the base member 22 to protect the insulated wire 30.

Moreover, if the above-described base member 22 is a bendable member, the insulated wire 30 can be retained along a certain path by fixing the insulated wire 30 onto the main surface of the bendable base member 22. Thus, for example, by arranging the bendable base member 22 so as to conform to a surface of an assembly target member and then fixing the bendable base member 22, it is possible to easily incorporate the wire 30 for contactless energy transmission into the assembly target member. Alternatively, for example, it is possible to directly fix the wire 30 for contactless energy transmission to a bendable member serving as a component of the vehicle.

Furthermore, if the base member 22 is a vehicle body component that is hard enough to retain a certain shape, the wire 30 for contactless energy transmission can be directly retained on this vehicle body component along a certain path. Moreover, a coil or an antenna for contactless power supply or wireless communication can be incorporated into a vehicle body component, and this also contributes to space saving.

Examples of incorporation of the present component 20 for contactless energy transmission will be described in greater detail in Embodiments 2 to 4 below.

Embodiment 2

Figure 6:
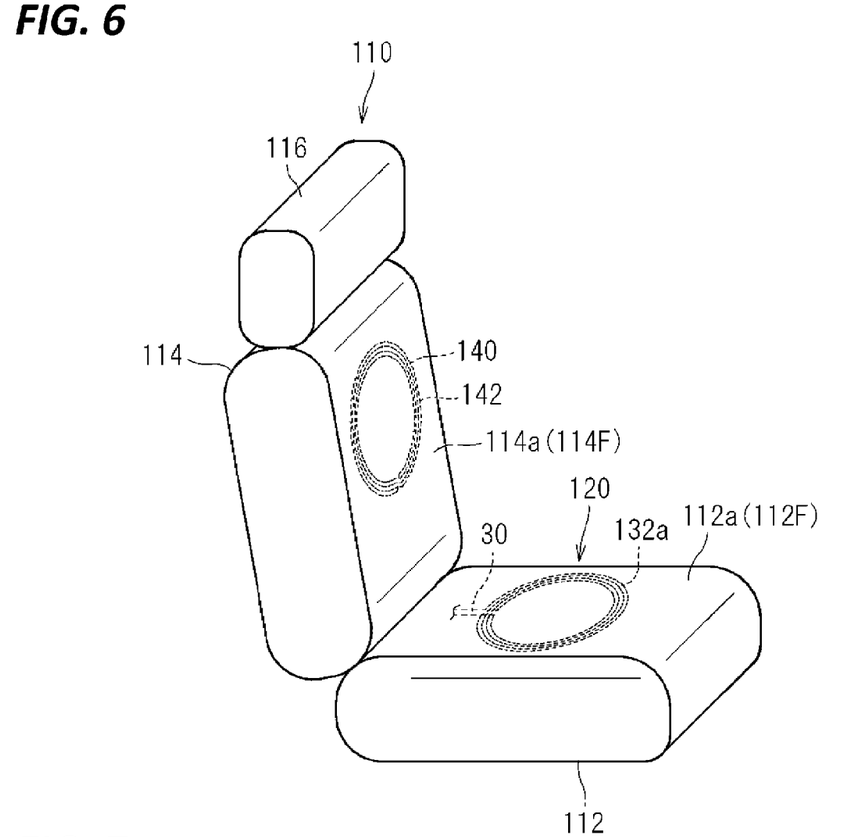
FIG. 6 is a schematic perspective view showing a seat according to Embodiment 2.

A component 120 for contactless energy transmission, and a seat 110 in which the component 120 for contactless energy transmission is incorporated, according to Embodiment 2 will be described. FIG. 6 is a schematic perspective view showing the seat 110 according to Embodiment 2. Note that, in the description of the present embodiment, constituent elements similar to those described in Embodiment 1 are denoted by the same reference numerals, and their descriptions are omitted.

Here, an example in which the seat 110 is a seat in a vehicle (especially, an automobile) will be described. The seat in a vehicle may be a driver's seat, a passenger seat, or a back seat. The seat may be a seat in a train, a plane, or the like, or may be a chair for office use or for home use.

The seat 110 includes a seat portion 112. Here, the seat 110 further includes a backrest portion 114.

The seat portion 112 is formed into a flat shape, and a person will be seated on the seat portion 112.

The backrest portion 114 extends upward from a portion of the periphery of the seat portion 112. A person seated on the seat portion 112 can lean his/her back against the backrest portion 114. Here, a headrest 116 is provided on top of the backrest portion 114, but this is not essential.

The component 120 for contactless energy transmission incorporated in the present seat 110 includes, as the base member, an outer covering 112a on an upper surface of the seat portion 112, and also includes, as the wire for contactless energy transmission, an insulated wire 30.

That is to say, the seat portion 112 has a configuration in which an elastic material such as a cushion is covered by the outer covering 112a. The outer covering 112a is a bendable (flexible) sheet-like member, and also the entirety thereof constitutes a flat portion 112F. The insulated wire 30 is directly fixed onto a main surface of the outer covering 112a. Here, the insulated wire 30 is fixed to the back face side of the outer covering 112a; however, the insulated wire 30 may be fixed to the front face side of the outer covering 112a. It is preferable to fix the insulated wire 30 to a portion of the outer covering 112a that covers the upper face side of the seat portion 112, but this is not essential. As the configuration for fixing the insulated wire 30 to the outer covering 112a, the configurations described in Embodiment 1 above can be used.

As in the case of Embodiment 1 above, the path along which the insulated wire 30 is fixed on the main surface of the outer covering 112a is a path suited to contactless energy transmission, and is here a certain path extending in a planar spiral shape, and this portion forms a coil portion 132a.

Figure 7:
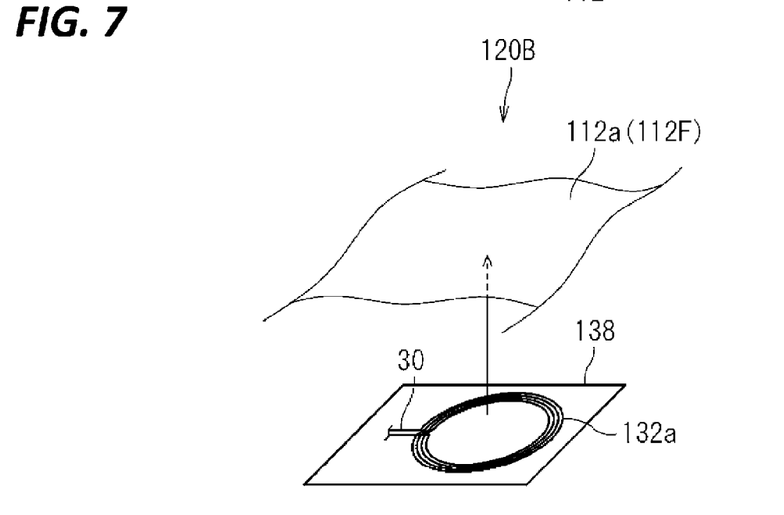
FIG. 7 is an explanatory diagram showing a modification of Embodiment 2.

As in a modification shown in FIG. 7, a component 120B for contactless energy transmission may be obtained by using a bendable sheet material 138 separate from the outer covering 112a as the base member and fixing the insulated wire 30 to the sheet material 138. This component 120B for contactless energy transmission may be, for example, attached to the back face side of the outer covering 112a, or sandwiched between the elastic member such as a cushion and the outer covering 112a. The insulated wire 30 may be fixed to a main surface of the sheet material 138 that faces toward the outer covering 112a, or a main surface thereof that faces toward the elastic member such as a cushion.

Moreover, an energy relay coil 140 is incorporated in the backrest portion 114. The energy relay coil 140 is obtained by shaping a wire 142 into a planar spiral form. As in the case of the above-described insulated wire 30, the wire 142 may be an insulated wire, a bare conducting wire, an enameled wire, a nichrome wire, or the like. Here, an example in which the wire 142 is an insulated wire 142 will be described.

The backrest portion 114 has a configuration in which an elastic material such as a cushion is covered by an outer covering 114a. The outer covering 114a is a bendable (flexible) sheet-like member, and the entirety thereof constitutes a flat portion 114F. The insulated wire 142 is directly fixed onto a main surface of the outer covering 114a. Here, the insulated wire 142 is fixed to the back face side of the outer covering 114a; however, the insulated wire 142 may be fixed to the front face side of the outer covering 114a. It is preferable to fix the insulated wire 142 to a portion of the outer covering 114a that covers the front side of the backrest portion 114, but this is not essential. As the configuration for fixing the insulated wire 142 to the outer covering 114a, the configurations described in Embodiment 1 above can be used.

The path along which the insulated wire 142 is fixed on the main surface of the outer covering 114a is a path suited to relaying the contactless energy transmission, and is here a certain path extending in a planar spiral shape. That is to say, the insulated wire 142 is fixed to the outer covering 114a, which serves as a base member, while being arranged along a certain path that forms a kind of coil.

When the backrest portion 114 is focused on, the outer covering 114a corresponds to the base member including the flat portion 114F, and the insulated wire 142 corresponds to the wire for contactless energy transmission fixed onto the main surface of the flat portion 114F while being arranged along a certain path. Moreover, the outer covering 114a also serves as an example of the bendable member.

As in the case of the modification shown in FIG. 7, a relay component for contactless energy transmission may be obtained by using a bendable sheet material separate from the outer covering 114a as the base member and fixing the insulated wire 142 to the sheet material and then incorporated into the backrest portion 114.

Figure 8:
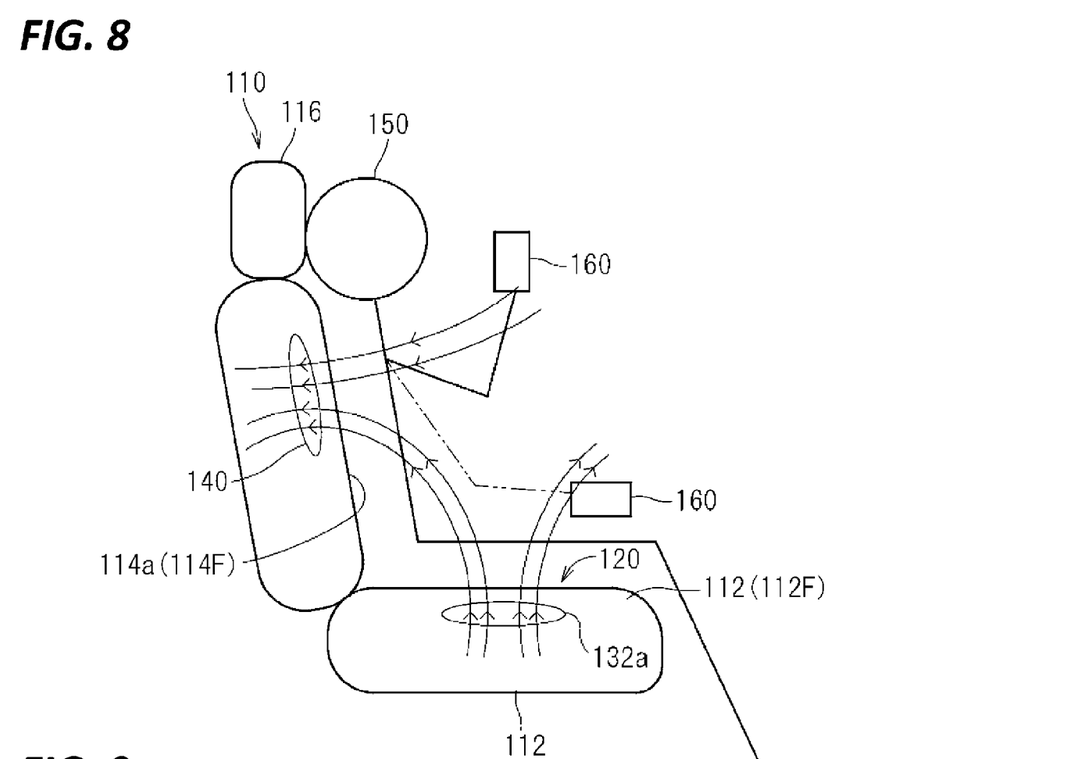
FIG. 8 is an explanatory diagram illustrating how a magnetic field is generated around the seat.

FIG. 8 is an explanatory diagram illustrating how a magnetic field is generated around the seat 110. As shown in FIG. 8, a magnetic field generated by the coil portion 132a of the insulated wire 30 incorporated in the seat portion 112 extends in a space above the seat portion 112. Moreover, the insulated wire 142 incorporated in the backrest portion 114 is magnetically coupled to the coil portion 132a and serves as the energy relay coil 140, and the magnetic field thus also extends in front of the energy relay coil 140.

Here, it is assumed that a person 150 seated on the seat 110 carries a terminal device 160. Also, it is assumed that the terminal device 160 has an incorporated coil or the like for receiving energy released from the coil portion 132a in a contactless manner.

It is conceivable that, for example, the person 150 in a seated position will hold the terminal device 160 in front of his/her face and operate it, or will hold the terminal device 160 at a position on his/her lap and operate it. In any case, the magnetic field generated by the coil portion 132a or the energy relay coil 140 extends widely above the seat portion 112 and in front of the backrest portion 114. Thus, the terminal device 160 can efficiently receive energy for power supply.

According to the present embodiment, similar effects to those of Embodiment 1 above can be obtained, with the exception of the effect obtained by using, as the base member, a vehicle body component that is hard enough to retain a certain shape.

Moreover, the present embodiment is suited to, for example, supplying power in a contactless manner to, or sending and receiving radio signals to and from, the terminal device 160 or the like carried by the person 150 seated on the seat 110.

In particular, since the energy relay coil 140 is incorporated in the backrest portion 114, the energy transmission range can be greatly expanded, and the present embodiment is thus even more suited to, for example, supplying power in a contactless manner to the terminal device 160 or the like carried by the person 150 seated on the seat 110.

The foregoing embodiment has been described using an example in which the power supply coil portion 132a is incorporated in the seat portion 112, and the energy relay coil 140 is incorporated in the backrest portion 114; however, conversely, a configuration may be adopted in which the power supply coil portion 132a is incorporated in the backrest portion 114, and the energy relay coil 140 is incorporated in the seat portion 112.

Embodiment 3

Figure 9:
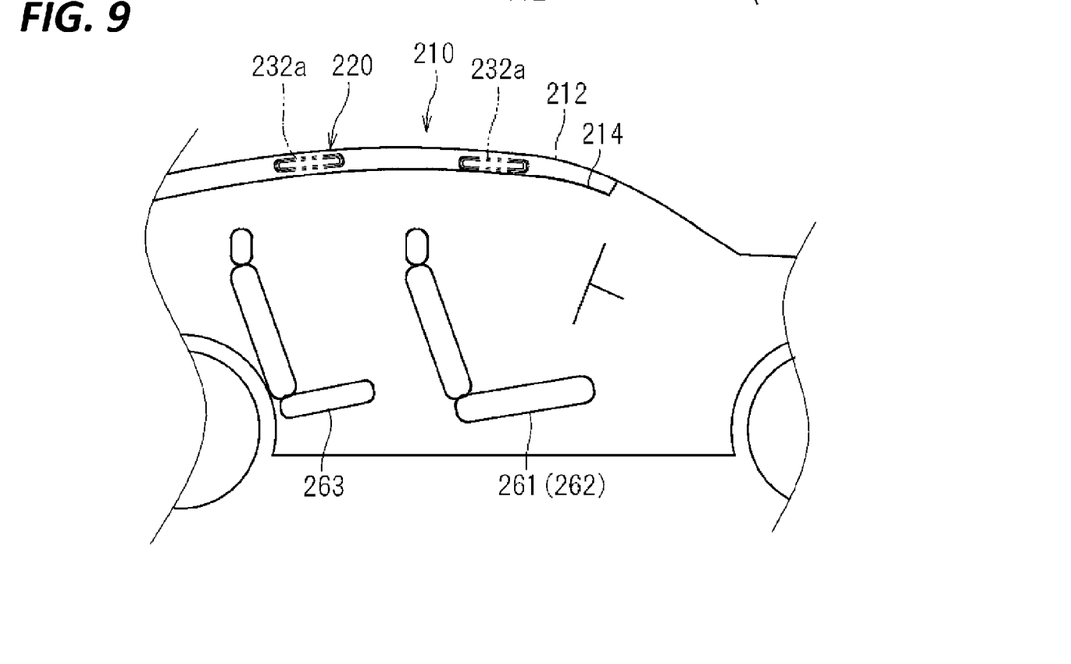
FIG. 9 is a schematic diagram showing a vehicle roof according to Embodiment 3.
Figure 10:
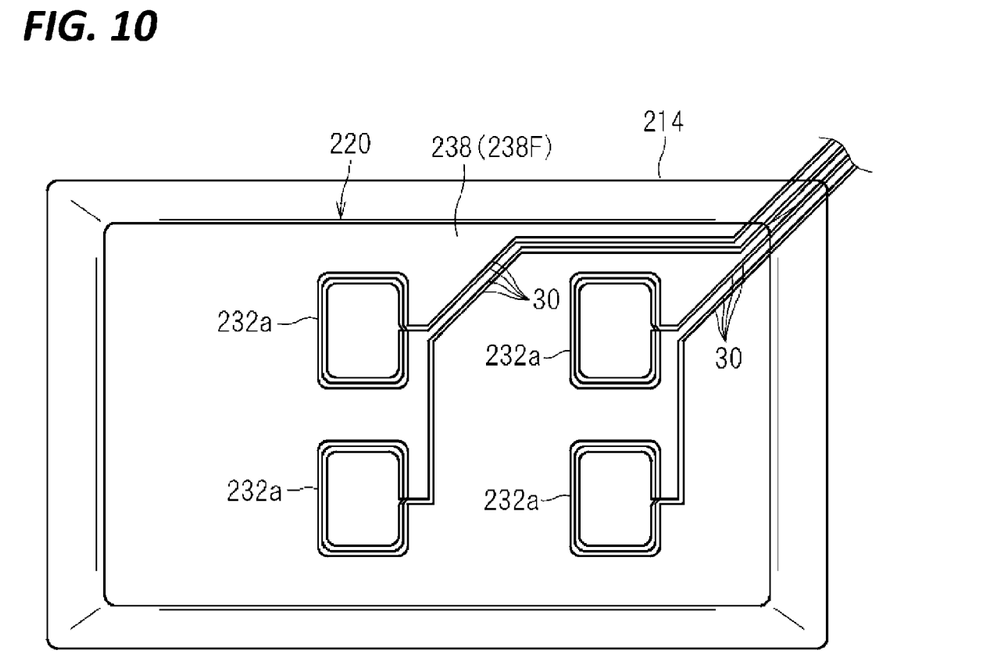
FIG. 10 is a schematic plan view showing a state in which a component for contactless energy transmission is incorporated in a roof lining of the vehicle roof.

A component 220 for contactless energy transmission, and a vehicle roof 210 in which the component 220 for contactless energy transmission is incorporated, according to Embodiment 3 will be described. FIG. 9 is a schematic diagram showing the vehicle roof 210 according to Embodiment 3, and FIG. 10 is a schematic plan view showing a state in which the component 220 for contactless energy transmission is incorporated in a roof lining 214 of the vehicle roof 210. Note that, in the description of the present embodiment, constituent elements similar to those described in Embodiment 1 are denoted by the same reference numerals, and their descriptions are omitted.

The vehicle roof 210 includes a roof main body 212 and the roof lining 214.

The roof main body 212 is a portion of the vehicle body, which forms a basic shape of the vehicle, that covers an upper portion of the vehicle interior, and is in the form of a plate made of a metal or the like. The corner portions and the like of the roof main body 212 are each provided with a pillar that supports the roof main body 212.

The roof lining 214 is a plate-shaped portion made of a resin or the like, and is in the form of a plate that covers the inner face side of the roof main body 212. The roof lining 214 is a kind of interior finishing member exposed to the vehicle interior, and serves as an example of the vehicle body component that is hard enough to retain a certain shape.

In a state in which the roof lining 214 is attached to the inner face side of the roof main body 212, a gap is created therebetween. Electric components such as an interior light, a switch, and a camera may be attached to the roof lining 214.

The component 220 for contactless energy transmission incorporated in the vehicle roof 210 includes a bendable sheet material 238 as the base member, and also includes an insulated wire 30 as the wire for contactless energy transmission.

As in the case of the bendable base member 22 described in Embodiment 1, it is conceivable that the sheet material 238 is, for example, a sheet material made of a material containing a resin such as PVC (polyvinyl chloride), PET (polyethylene terephthalate), or PP (polypropylene). This sheet material may be a sheet material that is uniformly filled with the material inside, or may be a nonwoven fabric sheet or the like. The sheet material can also contain a material such as a metal.

Here, the sheet material 238 is formed into a rectangular shape of substantially the same size as, or a smaller size than, the roof lining 214. It is preferable that the sheet material 238 has such a size that it can cover spaces above a plurality of seats in the vehicle interior. Also, the entire sheet material 238 constitutes a flat portion 238F. The insulated wire 30 is directly fixed onto a main surface of this sheet material 238. The insulated wire 30 may be fixed to the lower face side (roof lining 214 side) of the sheet material 238, or may be fixed to the upper face side (roof main body 212 side) of the sheet material 238. As the configuration for fixing the insulated wire 30 to the sheet material 238, the configurations described in Embodiment 1 above can be used.

As in the case of Embodiment 1 above, the path along which the insulated wire 30 is fixed on the main surface of the sheet material 238 is a path suited to contactless energy transmission, and is here a certain path extending in a planar rectangular spiral shape.

Here, a driver's seat 261 and a passenger seat 262 are provided in a front portion of the vehicle interior, and a back seat 263 is provided in a rear portion of the vehicle interior. Insulated wires 30 are fixed to respective regions of the sheet material 238 that are located above the driver's seat 261, above the passenger seat 262, above to the right of the back seat 263, and above to the left of the back seat 263, while being arranged along respective certain paths extending in a planar rectangular spiral shape. Thus, the insulated wires 30 include coil portions 232a. The insulated wires 30 are led out from portions that form the coil portions 232a toward the outside (toward a front pillar) of the sheet material 238, and are then connected, via a connector or the like, to a control unit or the like for contactless power supply or for communication.

This component 220 for contactless energy transmission including the insulated wires 30 and the sheet material 238 is fixed onto the roof lining 214 in a state in which the component 220 is spread out. For the fixation of the sheet material 238, various configurations such as a pressure-sensitive adhesive, an adhesive, and ultrasonic welding can be used.

As described in Embodiment 1, the coil portions 232a of the insulated wires 30 may be used as a power receiving coil for contactless power supply, or may be used as an antenna that performs at least one of sending and receiving electromagnetic wave energy.

A wire for supplying power to another electric component or a wire for signal transmission may also be fixed to the sheet material 238.

According to the present embodiment, similar effects to those of Embodiment 1 above can be obtained, with the exception of the effect obtained by using, as the base member, a vehicle body component that is hard enough to retain a certain shape.

Figure 11:
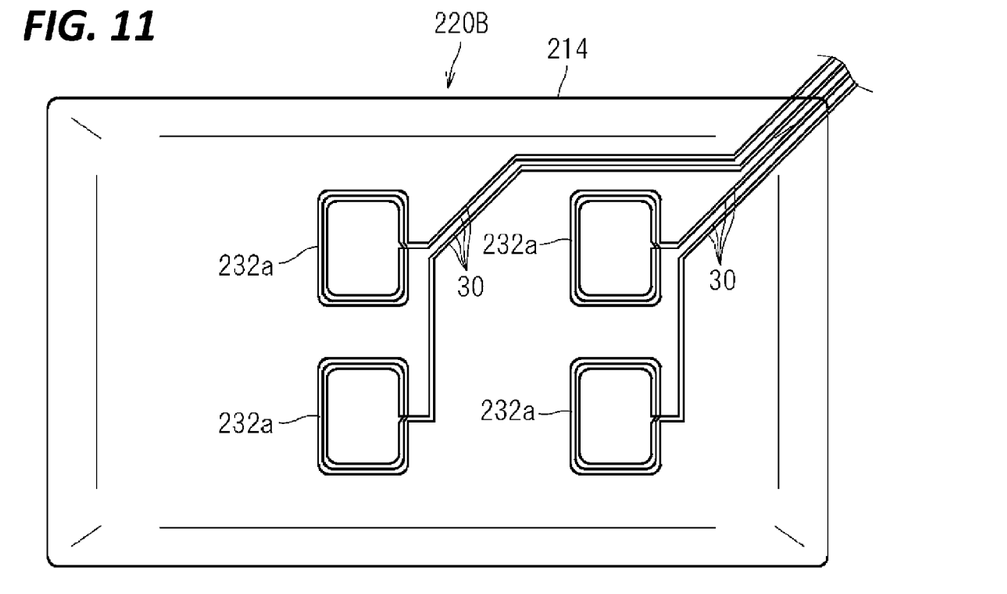
FIG. 11 is a schematic plan view showing a modification.

However, it is not essential that the insulated wires 30 be fixed to the bendable sheet material 238 that is separate from the roof lining 214 as in the present embodiment. For example, as in a modification shown in FIG. 11, a component 220B for contactless energy transmission may be obtained by directly fixing the insulated wires 30 to a main surface of the roof lining 214.

Moreover, according to the present embodiment, the coil portions 232a of the insulated wires 30 respectively provided above the seats 261, 262, and 263 can generate a magnetic field toward the corresponding seats 261, 262, and 263. Thus, the present embodiment is even more suited to, for example, supplying power in a contactless manner to, or sending and receiving radio signals to and from, a terminal device or the like carried by a person seated on the seat 261, 262, or 263.

Figure 12:
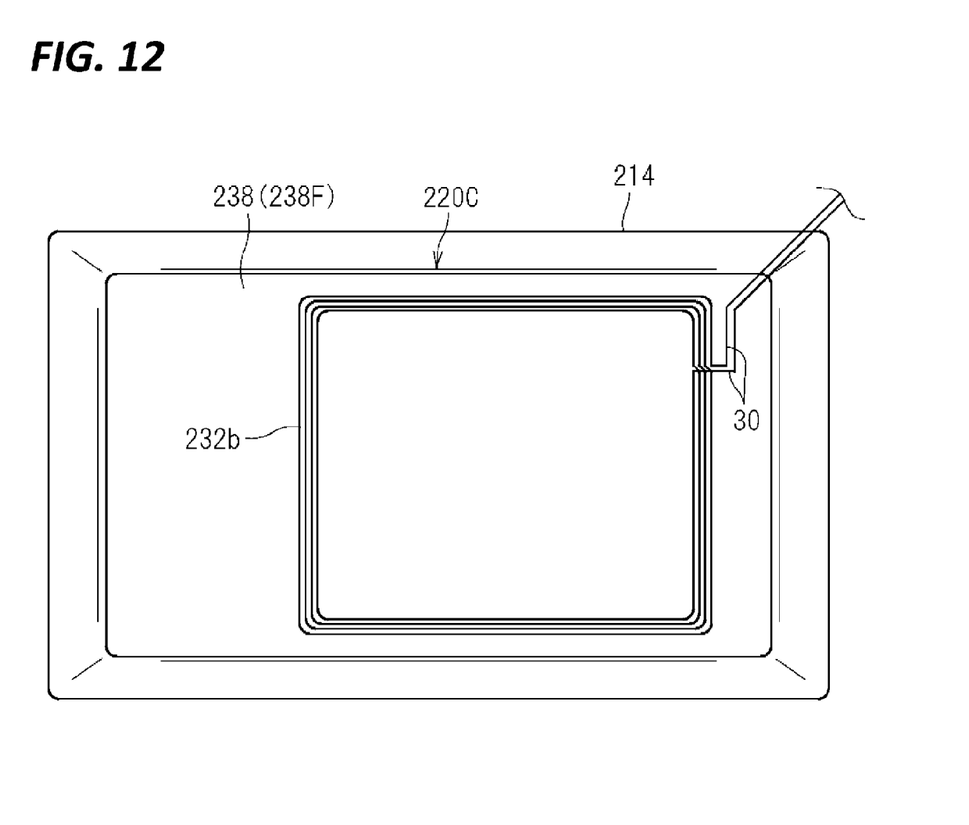
FIG. 12 is a schematic plan view showing another modification of Embodiment 3.

Note that it is not essential that the insulated wire 30 be fixed along a certain path extending in a planar rectangular spiral shape in each of the regions that are located above the driver's seat 261, above the passenger seat 262, above to the right of the back seat 263, and above to the left of the back seat 263. For example, as in a component 220C for contactless energy transmission shown in FIG. 12, a coil portion 232b may be formed by an insulated wire 30 being fixed to a region of the sheet material 238 that surrounds regions above the driver's seat 261, above the passenger seat 262, and above the back seat 263 while being arranged along a certain path extending in a single planar spiral (here, rectangular spiral) shape.

In the foregoing description, it is assumed that the wire for contactless energy transmission (here, the insulated wires 30) incorporated in the vehicle roof 210 performs energy transmission to or from a terminal device in the vehicle interior; however, the wire for contactless energy transmission may perform energy transmission to or from an external member outside the vehicle. For example, in the case where at least a portion of the roof main body 212 is made of a resin, the wire for contactless energy transmission incorporated in the roof lining 214 may be used as an antenna for receiving GPS signals, an antenna for sending and receiving mobile communication signals, or a power receiving coil to which power is supplied from an external member.

Embodiment 4

Figure 13:
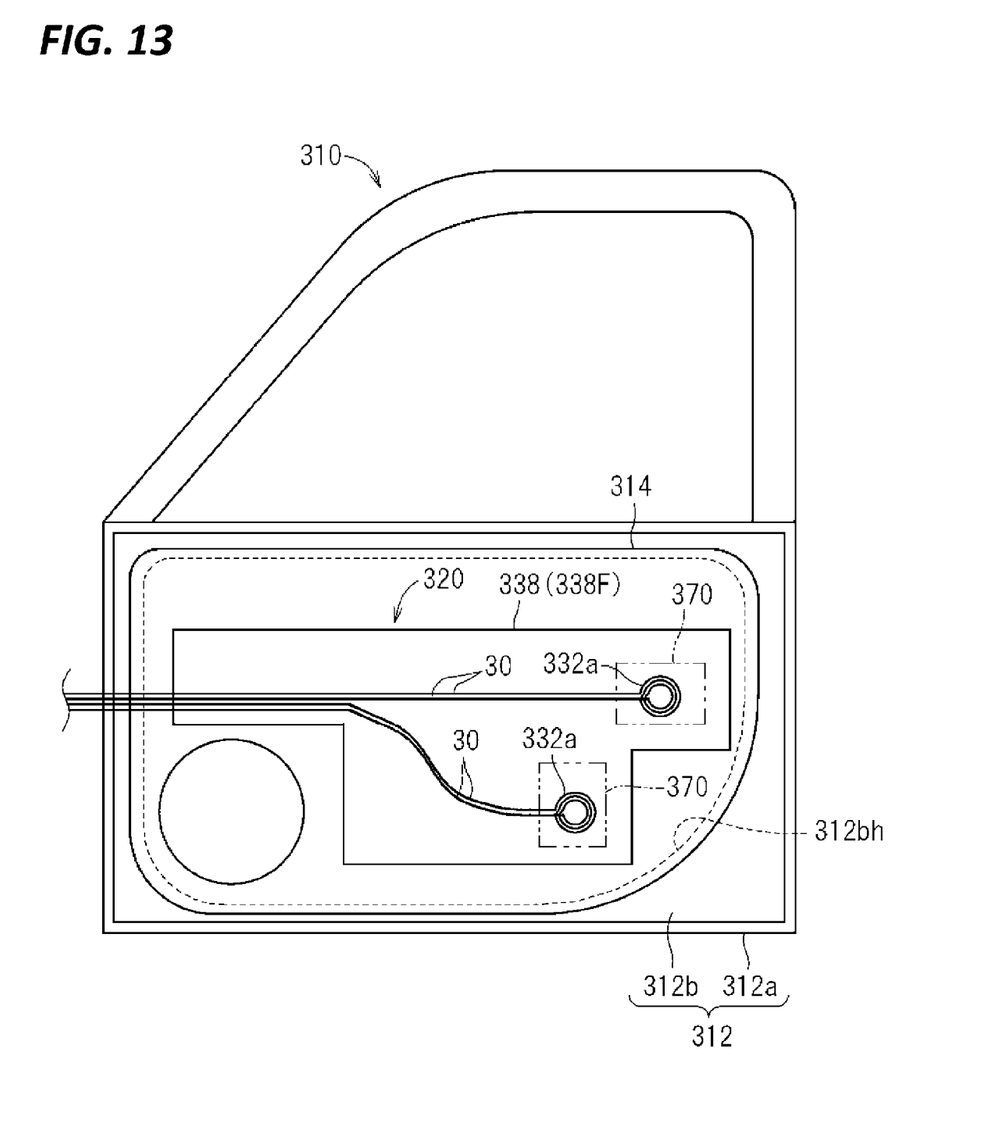
FIG. 13 is a schematic side view showing a vehicle door according to Embodiment 4.
Figure 14:
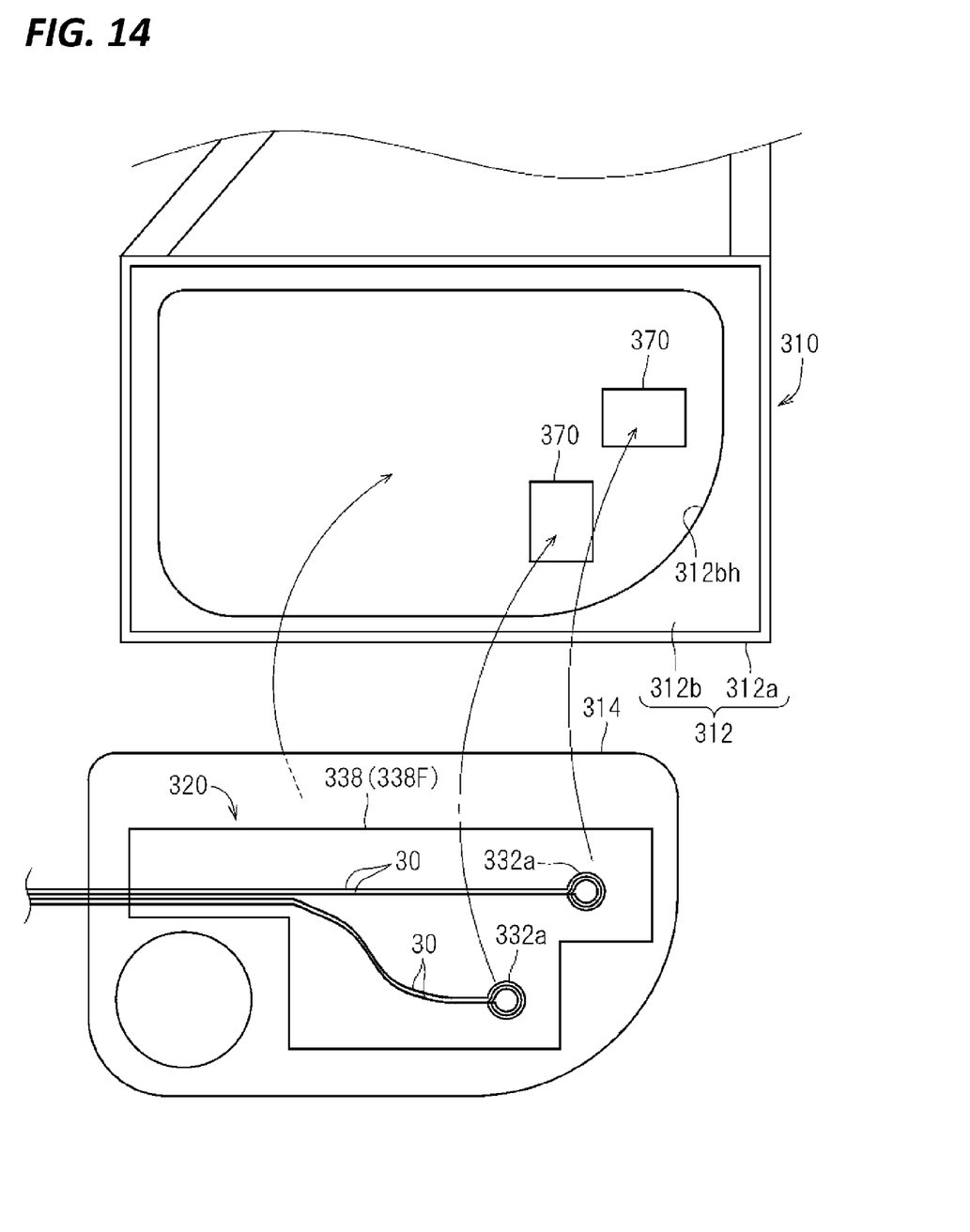
FIG. 14 is a schematic exploded view of the vehicle door.

A component 320 for contactless energy transmission, and a vehicle door 310 in which the component 320 for contactless energy transmission is incorporated, according to Embodiment 4 will be described. FIG. 13 is a schematic side view showing the vehicle door 310 according to Embodiment 4, and FIG. 14 is a schematic exploded view of the vehicle door 310. Note that, in the description of the present embodiment, constituent elements similar to those described in Embodiment 1 are denoted by the same reference numerals, and their descriptions are omitted.

The vehicle door 310 is a portion that is formed into a generally flat shape, and is provided in a vehicle in such a manner that it separates the inside of the vehicle interior from the outside of the vehicle interior and can be opened and closed. There may be cases where the vehicle door 310 is a door on the driver's seat side, a door on the passenger seat side, a door for the back seat, or the like.

The vehicle door 310 includes a metal panel 312 and a resin component 314 for the door.

The metal panel 312 includes a metal outer panel 312a and a metal inner panel 312b. The metal outer panel 312a is a portion that is provided in a portion of the vehicle door 310 that faces toward the outside of the vehicle, and constitutes the appearance of the vehicle together with the metal body. The metal inner panel 312b is provided on the vehicle interior side of the metal outer panel 312a. The metal inner panel 312b has an opening 312bh. The resin component 314 for the door is attached to this opening 312bh so as to close the opening 312bh.

The resin component 314 for the door is a flat resin component of substantially the same size as, or a larger size than, the opening 312bh, and serves as an example of the vehicle body component that is hard enough to retain a certain shape. In a state in which the resin component 314 for the door is attached to the opening 312bh of the metal inner panel 312b, the opening 312bh is blocked by the resin component 314. In a state in which the resin component 314 for the door is attached to the opening 312bh of the metal inner panel 312b, the attached state is maintained using a screw, a lock structure, or the like.

In a state in which the resin component 314 for the door is attached to the metal inner panel 312b, a space is formed between the metal outer panel 312a and the metal inner panel 312b and the resin component 314 for the door. Electric components 370 such as a motor for opening and closing a window, a motor for locking the door, and the like are incorporated in this space. Here, a state in which electric components 370 are incorporated in a rear portion and a lower rear portion of the metal panel 312 is shown.

A door trim, which is an interior finishing component exposed to the vehicle interior, may be provided on the vehicle interior side of the resin component 314 for the door.

The component 320 for contactless energy transmission incorporated in the vehicle door 310 includes a bendable sheet material 338 as the base member, and also includes an insulated wire 30 as the wire for contactless energy transmission.

As in the case of the bendable base member 22 described in Embodiment 1, it is conceivable that the sheet material 338 is, for example, a sheet material made of a material containing a resin such as PVC (polyvinyl chloride), PET (polyethylene terephthalate), or PP (polypropylene). This sheet material may be a sheet material that is uniformly filled with the material inside, or may be a nonwoven fabric sheet or the like. The sheet material can also contain a material such as a metal.

Here, the sheet material 338 is formed into a shape smaller than the resin component 314 for the door. Also, the entire sheet material 338 constitutes a flat portion 338F. The insulated wire 30 is directly fixed onto a main surface of the sheet material 338. The insulated wire 30 may be fixed to the outer face side (metal outer panel 312*a* side) of the sheet material 338, or may be fixed to the inner face side (vehicle interior side) of the sheet material 338. As the configuration for fixing the insulated wire 30 to the sheet material 338, the configurations described in Embodiment 1 above can be used.

As in the case of Embodiment 1 above, the path along which the insulated wire 30 is fixed on the main surface of the sheet material 238 is a path suited to contactless energy transmission, and here includes a certain path portion extending in a planar spiral shape.

Here, in regions of the metal panel 312 that are located adjacent to respective portions in which the electric components 370 are disposed, insulated wires 30 are respectively fixed along certain paths extending in a planar spiral shape. Thus, the insulated wires 30 include coil portions 332*a*. The insulated wires 30 are led out from portions that form the coil portions 332*a* toward the outside (here, a door hinge side) of the sheet material 238. The insulated wires 30 led to the outside of the sheet material 238 are then connected, via a connector or the like, to a control unit or the like for contactless power supply or for communication.

This component 320 for contactless energy transmission including the insulated wires 30 and the sheet material 338 is fixed to a main surface of the resin component 314 for the door in a state in which the component 320 is spread out. The component 320 for contactless energy transmission may be fixed to the outer face side (metal outer panel 312*a* side) of the resin component 314 for the door, or may be fixed to the inner face side (vehicle interior side) of the resin component 314 for the door. For the fixation of the component 320 for contactless energy transmission to the resin component 314 for the door, various configurations such as a pressure-sensitive adhesive, an adhesive, and ultrasonic welding can be used.

As described in Embodiment 1, the coil portions 332*a* of the insulated wires 30 may be used as a power receiving coil for contactless power supply, or may be used as an antenna that performs at least one of sending and receiving electromagnetic wave energy.

A wire for supplying power to another electric component or a wire for signal transmission may also be fixed to the sheet material 338.

When the resin component 314 for the door with the above-described component 320 for contactless energy transmission incorporated therein is attached to the metal panel 312, the coil portions 332*a* are arranged at positions that respectively oppose the electric components 370 attached to the metal panel 312. Thus, the coil portions 332*a* generate a magnetic field toward the corresponding electric components 370. Therefore, contactless power supply to, or sending and receiving control radio signals to and from, the electric components 370 attached to the vehicle door 310 can be realized.

The device to which contactless energy transmission from the coil portions 332*a* is to be performed may be an electric component that is attached to the vehicle interior side of the resin component 314 for the door, for example, a switching device or the like attached to the door trim. Also, the device to which contactless energy transmission from the coil portions 332*a* is to be performed may be various electric components in the vehicle interior, for example, a terminal device carried by a passenger.

According to the present embodiment, similar effects to those of Embodiment 1 above can be obtained, with the exception of the effect obtained by using, as the base member, a vehicle body component that is hard enough to retain a certain shape.

However, it is not essential that the insulated wires 30 be fixed to the bendable sheet material 338 that is separate from the resin component 314 for the door as described in the present embodiment. For example, as in a modification shown in FIG. 15, a component 320B for contactless energy transmission may also be obtained by directly fixing the insulated wires 30 to a main surface of the resin component 314 for the door.

Figure 15:
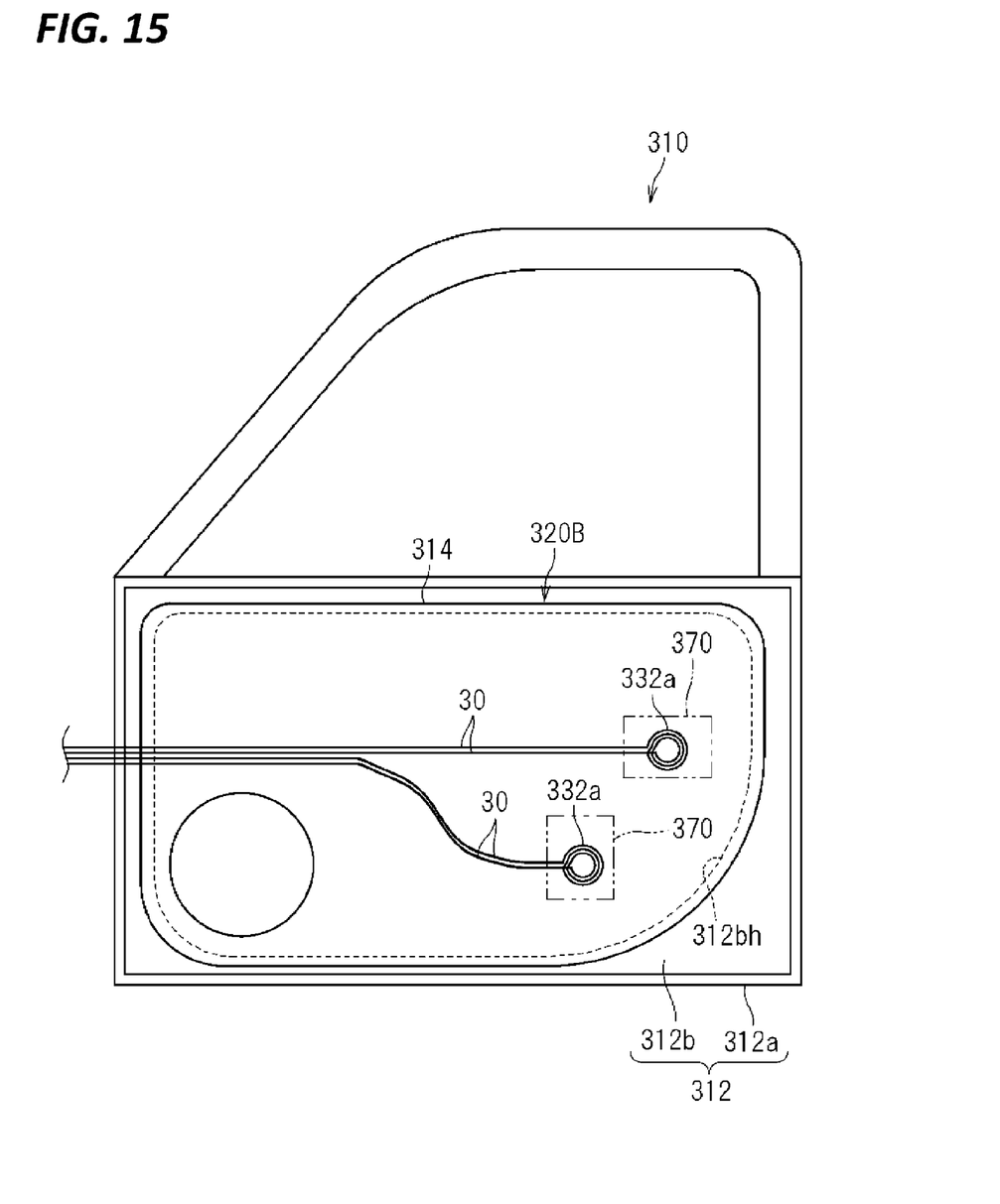
FIG. 15 is a schematic side view showing a modification of Embodiment 4.

Moreover, according to the present embodiment, the component 320 or 320B for contactless energy transmission is incorporated in the vehicle door 310, and the present embodiment is thus even more suited to, for example, supplying power in a contactless manner to, or sending and receiving radio signals to and from, the electric components 370 or the like incorporated in the vehicle door 310.

In particular, in a state in which the component 320 or 320B for contactless energy transmission is incorporated in the resin component 314 for the door, and the resin component 314 for the door is attached to the metal panel 312, the coil portions 332*a* are arranged respectively opposing the electric components 370 attached to the metal panel 312 or the door trim or the like. This configuration can eliminate the necessity for a configuration in which a power supply circuit or a control signal transmission circuit is connected to an electric component via a connector, and a wiring configuration and an operation for incorporating wiring can thus be simplified.

[Modifications]

Note that the configurations that have been described in the foregoing embodiments and modifications can be combined as appropriate unless they are inconsistent with one another. For example, two or more of Embodiments 2 to 4 may be combined and implemented in the same vehicle.

LIST OF REFERENCE NUMERALS

20 Component for contactless energy transmission
22 Base member
24 Flat portion
29 Joining portion
29B Sewing thread
30 Wire
30*a* Core
30*b* Insulating coating
32 Insulated wire
32*a* Coil portion
32*b* Leading path portion
38 Linear transmitting member
40 Contactless power supply system
42 Power supply device
42*a* Power supply coil
42*b* Capacitor
42*c* AC power source
44 Power receiving device
44*a* Power receiving coil
44*b* Capacitor
44*c* Load
50 Tip
52 Anvil
110 Seat
112 Seat portion
112F Flat portion
112*a* Outer covering
114 Backrest portion 114F Flat portion
114a Outer covering
116 Headrest
120 Component for contactless energy transmission
120B Component for contactless energy transmission
132a Coil portion
138 Sheet material
140 Energy relay coil
142 Wire
150 Person
160 Terminal device
210 Vehicle roof
212 Roof main body
214 Roof lining
220 Component for contactless energy transmission
220B Component for contactless energy transmission
220C Component for contactless energy transmission
232a Coil portion
232b Coil portion
238 Sheet material
238F Flat portion
261 Seat
261 Driver's seat
262 Seat (Passenger seat)
263 Seat (Back seat)
310 Vehicle door
312 Metal panel
312a Metal outer panel
312b Metal inner panel
312bh Opening
314 Resin component for door
320 Component for contactless energy transmission
320B Component for contactless energy transmission
332a Coil portion
338 Sheet material
338F Flat portion
370 Electric component

What is claimed is:

1. A vehicle roof in which a component for contactless energy transmission is incorporated, the component comprising a base member including a flat portion and a plurality of wires for contactless energy transmission, each of the plurality of wires comprising a core and an insulating coating that covers the core, wherein each of the plurality of wires includes a coil portion, the coil portion being incorporated in such a manner as to enable contactless energy transmission between the coil portion and a terminal device carried by a person seated on a seat, and the coil portions of the plurality of wires are provided above a driver's seat, a passenger seat, and a back seat, respectively, on the single base member, the coil portions are fixed to the single base member in a state in which each of the plurality of coil portions is fixed along a certain path that forms a planar spiral loop on the main surface of the flat portion of the single base member in a state in which the coil portions do not contact each other, and a portion of a first wire of the plurality of wires crosses another portion of the first wire.

2. The vehicle roof according to claim 1,
wherein the base member is a bendable member.

3. The vehicle roof according to claim 1,
wherein the base member is a vehicle body component that is hard enough to retain a certain shape.

4. The vehicle roof according to claim 1,
wherein each of the plurality of wires further includes a first leading path portion connected to a starting end of the coil portion and a second leading path portion connected to a terminating end of the coil portion, and the second leading path portion crosses the coil portion.

5. The vehicle roof according to claim 4,
wherein the first leading path portions and the second leading path portions of the plurality of wires are led out from the coil portions toward a first corner of the single base member while not contacting each other.

* * * * *